(12) United States Patent
Gandhi et al.

(10) Patent No.: US 7,836,064 B2
(45) Date of Patent: Nov. 16, 2010

(54) SYSTEM AND METHOD FOR PROVIDING IMPROVED ACCESS TO A SEARCH TOOL IN ELECTRONIC MAIL-ENABLED APPLICATIONS

(75) Inventors: Ashit Gandhi, Atlanta, GA (US); Edward Seitz, Atlanta, GA (US); Eric Burke, Northville, MI (US)

(73) Assignee: Yahoo! Inc., Sunnyvale, CA (US)

( * ) Notice: Subject to any disclaimer, the term of this patent is extended or adjusted under 35 U.S.C. 154(b) by 385 days.

(21) Appl. No.: 11/256,000

(22) Filed: Oct. 24, 2005

(65) Prior Publication Data
US 2006/0136420 A1 Jun. 22, 2006

Related U.S. Application Data

(62) Division of application No. 11/223,138, filed on Sep. 12, 2005.

(60) Provisional application No. 60/637,978, filed on Dec. 20, 2004.

(51) Int. Cl.
G06F 7/00 (2006.01)
G06F 17/30 (2006.01)
(52) U.S. Cl. .................................................. 707/758
(58) Field of Classification Search .................. 707/102, 707/758
See application file for complete search history.

(56) References Cited

U.S. PATENT DOCUMENTS

| | | | | |
|---|---|---|---|---|
| 6,029,164 A * | 2/2000 | Birrell et al. | ............... | 707/3 |
| 6,173,406 B1 * | 1/2001 | Wang et al. | ............... | 726/3 |
| 6,212,535 B1 * | 4/2001 | Weikart et al. | ............... | 715/207 |
| 6,331,867 B1 * | 12/2001 | Eberhard et al. | ............... | 715/864 |
| 6,338,059 B1 * | 1/2002 | Fields et al. | ............... | 1/1 |
| 6,615,247 B1 * | 9/2003 | Murphy | ............... | 709/217 |
| 6,725,269 B1 * | 4/2004 | Megiddo | ............... | 709/228 |
| 6,732,149 B1 | 5/2004 | Kephart | | |
| 6,871,214 B2 * | 3/2005 | Parsons et al. | ............... | 709/206 |
| 2002/0070963 A1 * | 6/2002 | Odero et al. | ............... | 345/739 |
| 2004/0093566 A1 | 5/2004 | McElligott | | |

OTHER PUBLICATIONS http://web.archive.org/web/20040401205425/www.lookoutsoft.com/Lookout/download.html.*
http://www.ingroup.com/portfolio/lookout_comments.htm.*
Google Toolbar, 2001, http://web.archive.org/web/20010202030300/toolbar.google.com.*

(Continued)

*Primary Examiner*—Greta L Robinson
*Assistant Examiner*—Jeffrey Chang
(74) *Attorney, Agent, or Firm*—James J. DeCarlo; Greenberg Traurig, LLP

(57) ABSTRACT

Disclosed is a system and method for providing users of web-accessible E-mail services with improved access to their E-mail messages and other information. In one embodiment, access to a search tool is provided to users of a web-accessible electronic mail service by software which integrates with a mail-enabled application running on a user's client machine. The software displays a field within a user interface of the mail-enabled application for receiving user input of a search term. The search term is used to build a URL that is communicated to a web-accessible E-mail service. A browser is launched to display at least one page resulting from the communication of the URL.

18 Claims, 3 Drawing Sheets

OTHER PUBLICATIONS http_web archive org_web_20040401185915_blogs officezealot com_marc_archives_000407, 2004.
http_web archive org_web_20040402233643_www lookoutsoft com_, 2004.
http://www.softwarereality.com/reviews/lookout.jsp, Mar. 21, 2004.
http://web.archive.org/web/20040401143338/www.projectified.com/2004/02/its_not_really_.html, 2004.
Written Opinion of The International Searching Authority (PCT/US05/43677), Jun. 10, 2006.

* cited by examiner

SYSTEM AND METHOD FOR PROVIDING IMPROVED ACCESS TO A SEARCH TOOL IN ELECTRONIC MAIL-ENABLED APPLICATIONS

This application is a divisional of U.S. Utility patent application Ser. No. 11/223,138 filed Sep. 12, 2005 and entitled "System and Method for Providing Improved Electronic Mail Accessibility," which claims priority to U.S. Provisional Patent Application No. 60/637,978 filed Dec. 20, 2004, the entire disclosures of which are incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of mail-enabled applications, and in particular to systems and methods for delivering features that provide improved functionality and/or user interfacing in such applications.

BACKGROUND OF THE INVENTION

Web-accessible E-mail services such as Yahoo! Mail, provided by Yahoo!, Inc. of Sunnyvale, Calif., have a large user base throughout the world. The majority of users access such services through a web browser, but there are millions of users who use mail-enabled applications employing the Post Office Protocol ("POP") to access their E-mail accounts with such services. Such mail-enabled applications include, e.g., OUTLOOK and OUTLOOK EXPRESS published by Microsoft Corporation of Redmond, Wash. In addition, a large number of users spend a significant amount of time using mail-enabled applications when at work to access work-related E-mail. It is common for such users to use these mail-enabled applications all day for work purposes, and periodically check personal mail accounts in a browser window. In both cases, it is desirable to increase the accessibility of the web-accessible E-mail service to these users, while extending features of such services to the desktop.

One such feature is SPAM control for web-accessible E-mail users who use POP to retrieve E-mail. SPAM remains a huge problem and most web-accessible E-mail services do not provide adequate SPAM-control features, particularly to users who use the POP protocol to receive E-mail.

SPAM is one of the greatest challenges facing users of web-accessible mail services such as Yahoo! Mail. Yahoo! Mail uses tools such as SpamGuard and SpamGuard Plus to detect incoming SPAM. These tools combine various functionality, including IP blocking, content analysis and filtering, and virus blocking. This has proven to be an effective solution for most Yahoo! users that use Yahoo! Mail through the web interface. Effectiveness (% of SPAM correctly caught) is estimated to be 95% for SpamGuard and 97% for SpamGuard Plus. SpamGuard Plus includes Bayesian filtering which allows users to train the system to predict what is SPAM given the user's preferences.

However, SpamGuard and related solutions are conventionally unavailable to users that use POP to retrieve their E-mail from their mail-enabled applications.

Mail-enabled applications that use POP to retrieve a user's E-mail from web-accessible mail services typically retrieve both "good" mail and messages that have been identified as SPAM by SPAM-filtering software operated by the mail service or other third party. Even though the SPAM messages may have been marked as SPAM by such software, there is no logic to route these messages to an appropriate folder on the user's computer. As a response, many users of web-accessible E-mail services have their settings set to not download their SPAM email. Thus, for the user to check for false-positives, i.e., messages that have been incorrectly identified as SPAM, the user typically must remember to access their account via a browser, rather than using POP, to review their Bulk folder. Few users will go to such lengths to check for false-positives, resulting in the non-delivery of some legitimate messages.

Another feature that leaves room for improvement is the built-in search functionality typically provided in mail-enabled applications such as OUTLOOK and OUTLOOK EXPRESS. Such search functionality provides a weak user experience in that it is relatively slow and inflexible. Google Inc., of Mountain View, Calif., recently launched a beta application called GOOGLE DESKTOP which indexes local files—including E-mail messages stored by OUTLOOK and OUTLOOK EXPRESS. A number of smaller companies have begun to offer powerful desktop search tools. Mail search remains one of the key features in these desktop search tools, but many mail-enabled applications do not allow the mail search features of desktop search tools to access the mail messages stored therein.

SUMMARY OF THE INVENTION

Accordingly, the present invention is directed to a system and method for providing improved E-mail accessibility that substantially obviates one or more of the problems due to limitations and disadvantages of the related art.

An exemplary embodiment of the present invention provides users of web-accessible E-mail services with improved access to their E-mail messages.

In one embodiment, access to a search tool is provided to users of a web-accessible electronic mail service by software which integrates with a mail-enabled application running on a user's client machine. The software displays a field within a user interface of the mail-enabled application for receiving user input of a search term. The search term is used to build a URL that is communicated to a web-accessible E-mail service. A browser is launched to display at least one page resulting from the communication of the URL.

Additional features and advantages of the invention will be set forth in the description which follows, and in part will be apparent from the description, or may be learned by practice of the invention, which is set forth in the appended claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention, and not limit same, which is set forth in the appended claims.

In the drawings.

DETAILED DESCRIPTION OF THE PREFERRED EMBODIMENTS

Figure 1:
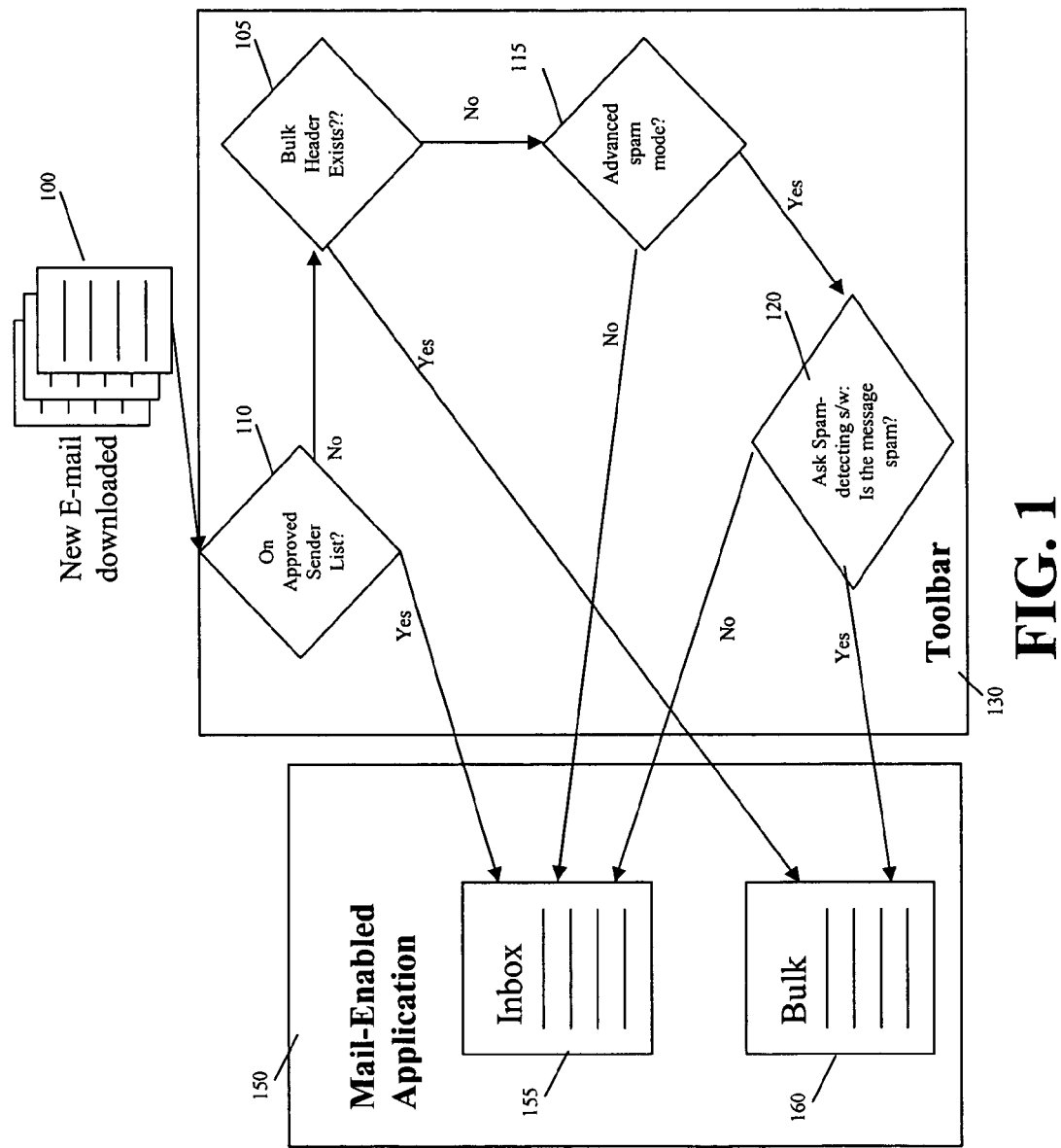
FIG. 1 is a block diagram illustrating data flow in accordance with an embodiment of the invention.

Reference will now be made in detail to embodiments of the present invention, examples of which are illustrated in the accompanying drawings.

Improved functionality and user interface features are provided for mail-enabled applications. In this respect, "mail-enabled application" as used herein means a software application which uses a mail protocol, including but not limited to POP, SMTP, or IMAP, to communicate with a mail server. In a first embodiment, users of a web-accessible E-mail service can receive the benefit of the SPAM-control features provided by that E-mail service even though the users access their E-mails via a mail-enabled application. This functionality can be provided via a variety of means, including, without limitation, a toolbar, plug-in, Dynamic Link Library (".DLL"), or the like, which integrates with and adds features or functionality to, or enhances existing features and/or functionality present in, an existing mail-enabled application. Alternatively, this embodiment can be provided by integrating the features or functionality into a mail-enabled application at the source-code level.

In an exemplary embodiment, a toolbar is provided that loads as a .DLL when the mail-enabled application is run on the user's client machine or when that machine's operating system boots. The toolbar adds to the mail-enabled application's functionality by scanning each E-mail message for a bulk-indicating header. Such a header can be inserted by SPAM detection software on the E-mail server when an E-mail is identified as SPAM. Such messages are then routed to the user's bulk folder on their client machine automatically. Although the current embodiment is described primarily with respect to a header inserted by SPAM-detecting software, it will be apparent to one skilled in the art that other headers or indicia inserted into the E-mail, including without limitation headers inserted by SPAM-detecting software running on a server, router, gateway, the user's desktop, or elsewhere, may be detected and used as a basis to re-route a message to the user's bulk folder. Table 1, below, is an example of an E-mail header which includes a bulk-indicating line that may be detected in accordance with one embodiment:

TABLE 1

X-Apparently-To: xxxtest.tiere003@btinternet.com via 217.12.12.60;
Mon, 18 Oct 2004 16:05:00
X-YahooFilteredBulk: 216.136.173.32
X-Originating-IP: [216.136.173.32]
Return-Path: <xxxtest.tiere003@btinternet.com>
Received: from 216.136.173.32 (HELO smtp012.mail.yahoo.com)
(216.136.173.32) by mta802.mail.ukl.yahoo.com with SMTP; Mon,
18 Oct 2004 16:05:00 +0000
Received: from unknown (HELO vargon) (xxxtest.tiere003@btinternet.
com@63.172.193.57 with login) by smtp012.mail.yahoo.com with
SMTP; 18 Oct 2004 16:04:58 –0000
Message-ID: <003001c4b52c$36eaea10$4c4015ac@vargon>
From: "Test Account" <xxxtest.tiere003@btinternet.com>
To: <xxxtest.tiere003@btinternet.com>
Subject: Fw: No cost Laptop
Date: Mon, 18 Oct 2004 12:04:55 –0400
MIME-Version: 1.0
Content-Type: multipart/alternative;
boundary="----=_NextPart_000_002D_01C4B50A.AF515560"
X-Priority: 3
X-MSMail-Priority: Normal TABLE 1-continued X-Mailer: Microsoft OUTLOOK EXPRESS 6.00.2900.2180
X-MimeOLE: Produced By Microsoft MimeOLE V6.00.2900.2180

In the example header provided in Table 1, the line "X-YahooFilteredBulk: 216.136.173.32" is a bulk-indicating line that has been inserted by SPAM-detecting software running on an E-mail server operated by a web-accessible E-Mail provider.

FIG. 1 is a block diagram illustrating data flow within this first embodiment. In FIG. 1, each piece of newly downloaded E-mail 100 is scanned to determine whether a bulk header, and/or other spam-indicating header, is present in the E-mail (Block 105). If no such header exists, and if toolbar 130 is not operating in "Advanced" mode, E-mail 100 is routed to the user's inbox 155 within the mail-enabled application 150. In this respect, the toolbar of this embodiment preferably provides two modes of operation. The first is referred to herein as "All-in-one anti-spam mode" or "advanced mode" and the other is referred to herein as "Limited anti-spam mode" or "Simple mode." In Simple mode, toolbar software 130 looks for a bulk-indicating header in E-mail 100, and if one is found, moves that message to the user's Bulk Mail folder 160 unless the sender is on the an approved senders list, or "whitelist" 110; if the sender is on whitelist 110, the toolbar 130 ceases processing message 100 and routes it to Inbox 155. In Advanced mode, toolbar 130 first performs the Simple mode check. However, if the sender is not on whitelist 110 and message 100 does not contain a bulk-indicating header 105, toolbar 130 performs an Advanced check 120, which preferably includes passing the text of message 100 to SPAM-detecting software. Exemplary SPAM-detecting software includes, but is not limited to, SpamAssassin or other software that uses a rule-based algorithm and a Bayesian algorithm to determine whether or not message 100 is SPAM. If such software indicates that message 100 is SPAM, message 100 is moved to Bulk Folder 160.

Thus, with continued reference to FIG. 1, if E-mail 100 does not contain a bulk header and toolbar 130 is operating in "advanced" mode, the E-mail is checked again to confirm that it is not SPAM (Block 120) and then routed to the user's inbox 155 or a user-selected folder 160 as appropriate based on the results. If the E-mail message contains a bulk header, the sender is compared to the whitelist (Block 110). If the sender is on the whitelist, the E-mail is routed to the user's inbox 155; otherwise, the E-mail is routed to the user-specified bulk mail folder 160. Although the functionality is described with respect to newly downloaded E-mails, it should be apparent to one skilled in the art that periodic scanning of the user's inbox, or a subset thereof, could be substituted therefore without departing from the spirit or the scope of the invention.

In one embodiment, users can manually mark individual messages as containing SPAM or being SPAM-free. When a user indicates that a message was incorrectly identified as SPAM, the message is moved to the user's Inbox 155 and the sender is added to the Approved Sender list 110. Similarly, if the user marks a message as SPAM, it is moved to Bulk folder 160 and the sender is removed from Approved Sender list 110.

When the user manually indicates the status of an E-mail, this can add to the training of a local Bayesian filter. The local Bayesian filter allows toolbar 130 to more effectively identify similar messages in the future as SPAM or not, even if the SPAM-detecting software fails to do so. Bayesian filtering is the process of using Bayesian statistics to attempt to remove noise from a corrupted signal. Bayesian statistics is a paradigm of statistics that treats probabilities as estimates of uncertainty and derives methods of statistical inference from decision theory. Appropriate Bayesian filters include, without limitation those available under the open-source Apache license under the name SpamAssassin. To ensure that the Bayesian filter can identify mail as SPAM or not SPAM properly, a pre-trained filter database can be provided with toolbar 130 when first supplied to the user. Other learning filters and/or filters which apply probability theory to classify E-mail can be used as an alternative or in addition to the Bayesian filter. Such a filter can be implemented as part of step 120 of FIG. 1.

Another aspect of the invention that can be utilized alone or in combination with the anti-SPAM aspect described above allows users to access powerful mail search tools from within a mail-enabled application. Like the anti-SPAM functionality, this advanced E-mail search functionality can be provided in the form of a toolbar, plug-in, .DLL, or other means for adding features or functionality to an existing mail-enabled application, or alternatively can be provided in the form of features or functionality that are incorporated into a mail-enabled application at the source-code level.

The advanced search functionality of this embodiment allows users to search E-mail messages, attachments, contacts, calendar entries, notes, Yahoo! Instant Messenger archives, and/or other messaging-related repositories, from within a mail-enabled application. In the embodiments illustrated in FIGS. 2 and 3, a user can access the advanced search functionality via a toolbar that is integrated into or added onto a mail-enabled application.

Figure 3:
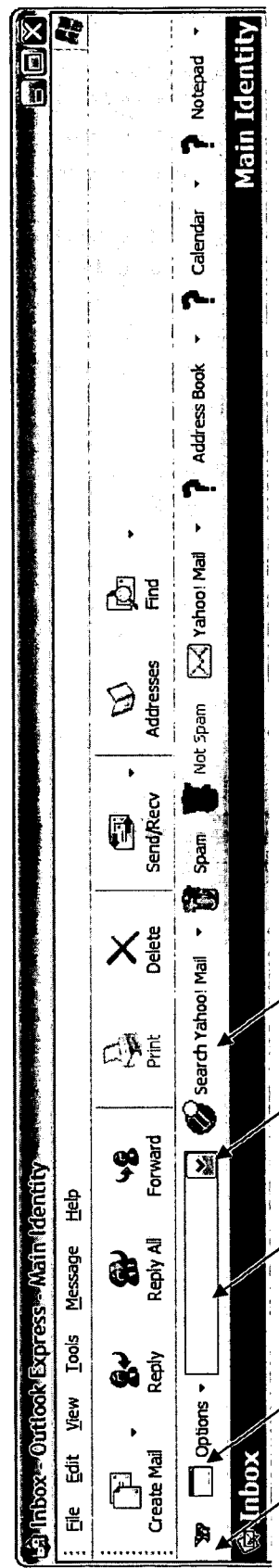
FIG. 3 is a screenshot illustrating a toolbar in accordance with another embodiment of the invention.

The functioning of the advanced search feature may differ based upon whether the feature is implemented as a toolbar for an application without a usable Application Program Interface (API), such as OUTLOOK EXPRESS, or for an application with such an API, such as OUTLOOK. For the former, as illustrated in FIG. 3, the user can select from a plurality of search options by choosing an appropriate entry from a list of options, the list preferably being displayed when the user clicks on Options button 305. When the user enters a search term into search box 310 on the toolbar 300 and hits ENTER, clicks the search button 320, or selects a previous search term listed in dropdown menu item 315, the program can build a URL from different pieces of search information.

The pieces of information that are used are defined by an XML feed, discussed in more detail below. Such pieces of information can include, but are not limited to, a literal portion of a URL such as "http://www.yahoo.com," a "value" passed in the feed, the search type to be performed, the text from the search box, and a registry value. Once the full URL is constructed, the toolbar can call the Windows ShellExecute( ) API Function Call, or other similar function call appropriate to the current operating system to launch a browser with that URL, the web browser requesting and displaying the URL.

Figure 2:
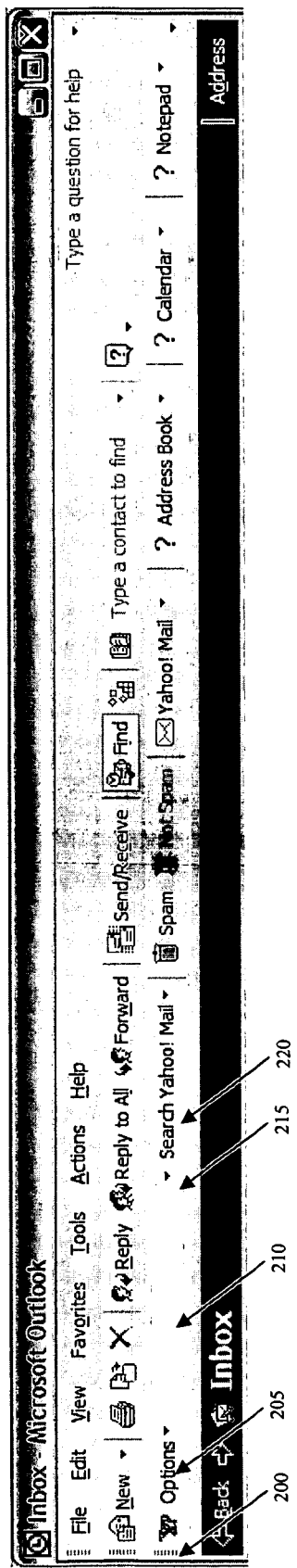
FIG. 2 is a screenshot illustrating a toolbar in accordance with an embodiment of the invention.

FIG. 2 illustrates an embodiment of the advanced search feature which can be implemented in connection with mail-enabled applications having a usable API, such as OUTLOOK. In this embodiment, the user can select from a plurality of search options by choosing an appropriate entry from a list of options, the list preferably being displayed when the user clicks on Options button 205. The user chooses the search terms by entering the terms in text box 210 or selecting a previously executed search term from dropdown box 315 on toolbar 300. The user can then press the ENTER key or click search button 220. A URL is then built from the search information in a similar manner as set forth above, and once the full URL is constructed, the toolbar can call the Windows ShellExecute( ) API function call or other similar API function call to launch a browser with that URL.

Two classes of toolbar embodiments will now be described. These embodiments are applicable to implementation of both the anti-SPAM aspects and the advanced search aspects described above. The first embodiment is a toolbar that resides within Microsoft OUTLOOK. The second embodiment is a toolbar that resides within Microsoft OUTLOOK EXPRESS. The functionality provided by each embodiment is similar, however the manner in which each of these exemplary embodiments is implemented is quite different. These embodiments are intended to be exemplary, and should not be read as limiting the invention to the specific embodiments described herein.

Both exemplary toolbar embodiments are "feed generated," meaning that button availability and placement can be determined by an external, web-based data source such as an XML data feed sent from a central server to the user's client machine. Table 2 is an exemplary XML feed.

TABLE 2

```
<?xml version="1.0" encoding="utf-8" ?>
<toolbar bid="ol" version="1.0">
    <fvs>
        <fv n="intl" v="us"/>
        <fv n="iu" v="us.yimg.com/i/tb/ol"/>
        <fv n="e1" v="bulk_junk_spam_deleted_trash_outbox_sent "/>
        <fv n="hver" v="10001"/>
        <fv n="SW1" v="You must supply a valid email address"/>
        <fv n="SW2" v="An account with that email address already exists. Please
try adding a different account."/>
        <fv n="SW3" v="There was an error creating the account in %s. Please try
again or create the account manually."/>
        <fv n="SW4" v="Sorry, the Yahoo! ID and/or password provided are invalid.
Please make sure you have entered the correct information."/>
        <fv n="SW5" v="The following accounts were successfully added:"/>
        <fv n="OL1" v="Yahoo! Toolbar for OUTLOOK"/>
        <fv n="OL2" v="You must restart OUTLOOK for changes to take effect.
Restart now?"/>
        <fv n="PW1" v="Please wait while your messages are processed..."/>
    </fvs>
    <btns>
        <btn bid="yhoo" tt="Yahoo!" t="0" s="512" i="logo.bmp"
u="_4_%http://www.yahoo.com/">
```

TABLE 2-continued

```
            <ps><p n="r" v="0"/></ps>
        </btn>
        <btn bid="opt" tt="Options" t="1" s="0" i="opt.bmp">
            <ps><p n="r" v="0"/></ps>
            <mis>
                <mi bid="refresh" tt="Refresh Toolbar" u="__6" s="32768"/>
                <mi bid="clearsh" tt="Clear Recent Searches" u="__39" s="32768"/>
                <mi bid="pop" tt="Add POP Accounts..." u="__101__1" s="32768"/>
                <mi bid="prefs" tt="Preferences..." u="__101__0" s="32768"/>
                <mi bid="sep" tt="-" s="32768"/>
                <mi bid="about" tt="About Yahoo! Toolbar" u="__7" s="32768"/>
                <mi bid="help" tt="Help" u="__4__%http://help.yahoo.com/" s="32768"/>
                <mi bid="uninst" tt="Uninstall Yahoo! Toolbar" u="__8" s="32768"/>
            </mis>
        </btn>
        <btn bid="ebox" t="9" s="0" u="__4__%http://search.yahoo.com/search?fr=ytol-__$REG__sc__%&p=__ebox">
            <ps><p n="w" v="150"/><p n="r" v="0"/></ps>
        </btn>
        <btn bid="srch" tt="Search Web" t="1" s="0">
            <mis>
                <mi bid="srch1" tt="Search Web" u="__103__srch__1__Search Web__nourl__noimage__ebox__2__notext___4__%http://search.yahoo.com/search?fr=ytol-__$REG__sc__%&p=__ebox__noimage" s="32768">
                    <ps><p n="i" v="srcht"/><p n="t" v="1"/><p n="v" v="1"/></ps>
                </mi>
                <mi bid="srch2" tt="Search Yahoo! Mail" u="__103__srch__1__Search Yahoo! Mail__nourl__noimage__ebox__2__notext___4__%http://mrd.mail.yahoo.com/search?find=1&s=__ebox__noimage" s="32768">
                    <ps><p n="i" v="srcht"/><p n="t" v="1"/><p n="v" v="0"/></ps>
                </mi>
                <mi bid="srch3" tt="Search Local Mail" u="__103__srch__1__Search Local Mail__nourl__noimage__ebox__2__notext___100__ebox__noimage" s="32768" x="16384">
                    <ps><p n="exf" v="__41__ebox"/></ps>
                </mi>
            </mis>
            <ps><p n="r" v="0"/></ps>
        </btn>
        <btn bid="spam" tt="Spam" t="0" s="67108864" i="spam.bmp" u="__102__1">
            <ps><p n="r" v="0"/></ps>
        </btn>
        <btn bid="nospam" tt="Not Spam" t="0" s="0" i="nospam.bmp" u="__102__0">
            ps><p n="r" v="0"/></ps>
        </btn>
        <btn bid="yma" tt="Yahoo! Mail" t="2" s="0" u="__4__%http://mail.yahoo.com/">
            <ps>
                <p n="at" v="$MAILCOUNT__% new message(s)"/>
                <p n="t0" v="Yahoo! Mail"/>
                <p n="t1" v="Yahoo! Mail (%d)"/>
            </ps>
            <mis>
                <mi bid="yma1" tt="Compose a Message" u="__4__%http://mrd.mail.yahoo.com/compose" s="32768"/>
                <mi bid="yma2" tt="Send a Greeting" u="__4__%http://greetings.yahoo.com/" s="32768"/>
                <mi bid="yma3" tt="-" s="32768"/>
                <mi bid="yma9" tt="Address Book" u="__4__%http://address.yahoo.com/" s="32768"/>
                <mi bid="yma10" tt="Calendar" u="__4__%http://calendar.yahoo.com/" s="32768"/>
                <mi bid="yma11" tt="Notepad" u="__4__%http://notepad.yahoo.com/" s="32768"/>
                <mi bid="yma12" tt="-" s="32768"/>
                <mi bid="yma13" tt="Help" u="__4__%http://help.yahoo.com/help/mail/" s="32768"/>
            </mis>
        </btn>
        <btn bid="add" tt="Address Book" t="2" s="0" u="__4__%http://address.yahoo.com/">
            <mis>
                <mi bid="add1" tt="Add Contact" u="__4__%http://address.yahoo.com/yab?A=a" s="32768"/>
                <mi bid="add2" tt="Distribution List" u="__4__%http://address.yahoo.com/yab?A=z" s="32768"/>
                <mi bid="add3" tt="Options" u="__4__%http://address.yahoo.com/yab?A=o" s="32768"/>
            </mis>
        </btn>
```

TABLE 2-continued

```
    <btn bid="cal" tt="Calendar" t="2" s="0"
u="__4__%http://calendar.yahoo.com/">
        <mis>
            <mi bid="cal1" tt="Add Event" u="__4__%http://calendar.yahoo.com/?v=5" s="32768"/>
            <mi bid="cal2" tt="Add Task" u="__4__%http://calendar.yahoo.com/?v=33" s="32768"/>
            <mi bid="cal3" tt="Add Birthday"
u="__4__%http://calendar.yahoo.com/?v=5&evt_type=13" s="32768"/>
            <mi bid="cal4" tt="-" s="32768"/>
            <mi bid="cal5" tt="Day" u="__4__%http://calendar.yahoo.com/?v=61" s="32768"/>
            <mi bid="cal6" tt="Week" u="__4__%http://calendar.yahoo.com/?v=1" s="32768"/>
            <mi bid="cal7" tt="Month" u="__4__%http://calendar.yahoo.com/?v=2" s="32768"/>
            <mi bid="cal8" tt="Year" u="__4__%http://calendar.yahoo.com/?v=3" s="32768"/>
            <mi bid="cal9" tt="-" s="32768"/>
            <mi bid="cal10" tt="Options" u="__4__%http://calendar.yahoo.com/yc/?v=70" s="32768"/>
            <mi bid="cal11" tt="Edit Time Guides"
u="__4__%http://calendar.yahoo.com/?v=95" s="32768"/>
        </mis>
    </btn>
    <btn bid="not" tt="Notepad" t="2" s="0" u="__4__%http://notepad.yahoo.com/">
        <mis>
            <mi bid="not1" tt="New Note" u="__4__%http://notepad.yahoo.com/?v=161" s="32768"/>
            <mi bid="not2" tt="New Folder" u="__4__%http://notepad.yahoo.com/?v=168" s="32768"/>
            <mi bid="not3" tt="-" s="32768"/>
            <mi bid="not4" tt="Options" u="__4__%http://notepad.yahoo.com/?v=165" s="32768"/>
        </mis>
    </btn>
    <btn bid="log" tt="Sign In" t="0" s="0" u="__104__1">
        <ps><p n="r" v="0"/></ps>
    </btn>
    <btn bid="out" tt="Sign Out" t="0" s="0" u="__104__0">
        <ps><p n="r" v="0"/></ps>
    </btn>
    </btns>
</toolbar>
```

As Table 2 illustrates, an XML feed preferably includes a well-structured set of information that defines the functionality to be provided by the toolbar. By way of example, without intending to limit the present invention, in Table 2 the <toolbar> and </toolbar> tags indicate that the information contained between those tags corresponds to a toolbar. Within the toolbar tags, the <fvs> and </fvs> tags indicate the start and end of a feed value definitions portion of the XML feed. Feed values are optional information that can be used throughout the toolbar, such as error messages or global values, such as a base uniform resource locator ("URL"). For example, the <fv n="SW1" v="You must supply a valid email address"/>tag sets up a global feed value whose name ("n") is "SW1", and with which the value ("v") of "You must supply a valid email address" is associated. If an error occurs, an error handler can refer to the SW1 feed value to determine appropriate text to be displayed to the user.

Referring again to Table 2, the <btns> and </btns> tags indicate the start and end of button definitions portion of the XML feed. Button definitions are optional in the XML feed, but where used, the <btn> definition can include a variety of attributes typically associated with a button, including a button ID ("bid"), icon ("i"), style ("s"), title ("tt"), URL ("u"), and extended style ("x"). Each button can also have optional child elements, or definitions, including parameters ("ps") and individual parameter attributes ("p"). Each parameter attribute can include a value ("v") and a convert flag ("cnv"). When these tags are combined, such as in the "<btn bid="ebox" t="9" s="0" u="__4__%http://search.yahoo.com/search?fr=ytol-_$REG_sc_%&p=_ebox"><ps><p n="w" v="150"/><p n="r" v="0"/></ps></btn>" series of tags, the tags define a button whose ID is "ebox", of type 9, style 0, with which a URL of "http://search.yahoo.com/search?fr=ytol-_$REG_sc_%&p=_ebox" is associated. Although a URL to an external server is included in this example, it should be apparent to one skilled in the art that a reference to a toolbar function, operating system API call, or the like can be substituted therefor without departing from the spirit or the scope of the invention.

Each button can also include optional menu item definitions ("mis"). Such menu items can, for example, be used to generate a drop-down list. Each defined menu item ("mi") can include attributes typically associated with a menu item or other user interface element, including a button identifier ("bid"), icon ("i"), style ("s"), title ("tt"), type ("t"), URL ("u") and extended style ("x").

Figure 4:
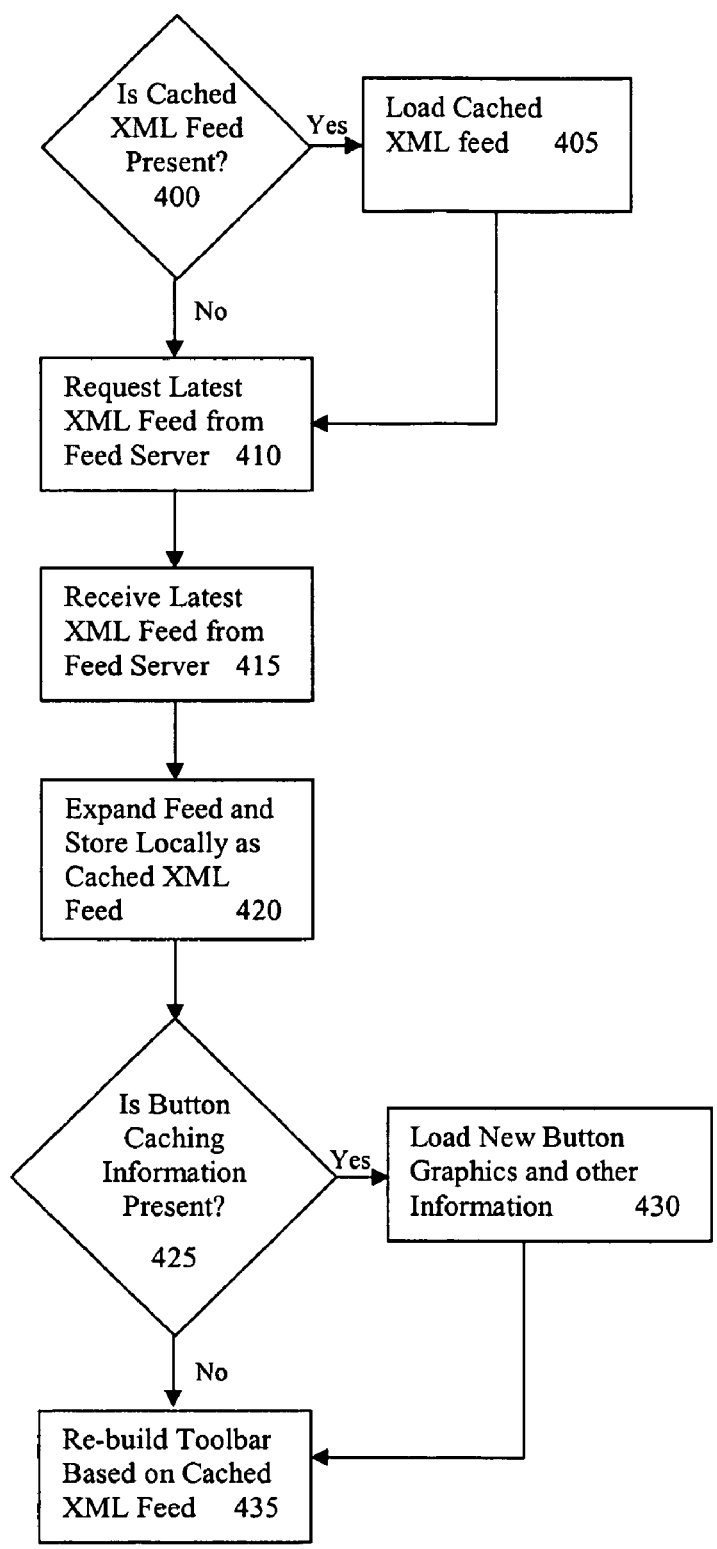
FIG. 4 is a flow diagram illustrating the fetch and processing of a data feed in accordance with an embodiment of the invention.

An XML data feed can be transmitted from a central server to a client machine on a regular basis or in response to a triggering event such as the loading of the user's mail-enabled application. This enables the provider of the external web-based data source to add or remove buttons from the toolbar for all users, or a subset of users, on an ongoing basis without modification of the code running on the user side and without requiring the user to install an update. The fetch of the data feed and processing of the same preferably operate as follows, as illustrated in FIG. 4. In Block 400, the toolbar looks for a cached XML feed on the local disk and loads it if found (Block 405). In Block 410, a request for a feed is made by the toolbar to a central server ("feed server") upon a triggering event such as the passage of time, loading of the mail-enabled application, or the like. In Block 415, the feed server generates a feed and returns it to the client machine. The toolbar software pre-processes the feed to expand any directives for caching of specific buttons in Block 420. The expanded feed is then stored on the local disk for later retrieval. If button caching information is present (Block 425), the button graphics and other information can be downloaded and stored locally (Block 430). The toolbar is then rebuilt based on the newly expanded feed such that it takes on the configuration as defined in the new feed. Such configuration may include, e.g., the placement and functions associated with buttons on the toolbar, the placement and functions associated with search boxes on the toolbar, the placement and function of drop-down boxes on the toolbar, and the placement of graphics and text on the toolbar.

Further details as to how to implement an XML data feed from a central server and use the same to configure features in an application running on a client machine can be found in commonly-owned U.S. Patent Application No. 60/681,458 entitled "Systems And Methods For Providing Features And User Interface In Network Browsing Applications," filed May 17, 2005, the entire disclosure of which is incorporated herein by reference.

To provide the feed features, as well as new mail alerts, a user ID of the user currently using the toolbar (e.g. the user's Yahoo! ID) can be utilized by the toolbar. The toolbar can automatically log in the user to the web-accessible E-mail service if the user provides a user ID and password, or other details sufficient for identification of the user. Such user IDs and passwords can be provided, for example, as part of the toolbar installation process, during the first instantiation of the toolbar, or each time the toolbar is loaded Since it is presently preferred to allow only a single user ID to be logged in with a persistent state on a single Windows session, and to ensure compatibility with other Yahoo! applications, the toolbar can obtain the currently valid login credentials or other user identification information from another application such as Yahoo! Messenger, if available. This helps to ensure a more seamless experience between software products and prevents the confusion that might occur if the toolbar account replaced any other currently-logged-in account.

With respect to the embodiment illustrated in FIG. 2, Microsoft OUTLOOK permits functionality extension of OUTLOOK through the OUTLOOK Object Model (OOM). Utilizing OOM, software can add a toolbar to OUTLOOK's existing toolbars, e.g., by embodying the toolbar functionality in a .DLL and registering the .DLL so that it loads when, or just after, OUTLOOK loads. The OOM also provides high-level access to OUTLOOK's E-mail stores, including a user's inbox. Unfortunately, the data provided by OOM is often tainted or may trigger OUTLOOK security alerts when accessed. To address this issue, E-mail can be accessed via Extended MAPI which is not subject to the limitations of the OOM.

OUTLOOK EXPRESS, on the other hand, presently provides no API or interface for easily adding a toolbar to its existing toolbars. Thus, as an alternative to using the Extended MAPI or other API as discussed above, code can be injected into the OUTLOOK EXPRESS process to alter its functionality from within, thereby providing an additional toolbar. Custom controls can be created to provide some aspects of this toolbar in order to ensure compatibility with OUTLOOK EXPRESS.

In one exemplary embodiment, a toolbar can be integrated into mail-enabled applications which lack a usable API, such as OUTLOOK EXPRESS, via an executable such as an .exe file which runs in the background on the client machine and constantly watches for the mail-enabled program to start up. When such start up is detected, the executable installs a hook into the mail-enabled application's process. The hook can be implemented in a DLL. Once the hook is installed, the toolbar is able to access the application's memory areas and objects directly via operating system APIs. Thus, for example, to add the toolbar, one can locate existing toolbars in the mail-enabled application and provide code to inject another toolbar therein. To prevent a crash, any clicks or actions resulting from this injected toolbar typically must be trapped before the mail-enabled application "sees" them since the toolbar is unexpected by the application. Thus, the software in accordance with this embodiment preferably filters out any messages generated by such clicks or actions so that the mail-enabled application is not aware of the software's presence in the mail-enabled application's memory space.

It is noted that Microsoft does provide an application programmer interface ("API") which permits access to OUTLOOK EXPRESS' message store. By providing code which interfaces with this API, messages in the OUTLOOK EXPRESS "Local Folders" can be accessed. However, this API does not presently permit access to other E-mail archives, such as those accessible via IMAP or HTTP.

In addition to providing the SPAM-processing and search functions described above, the disclosed toolbars can provide a platform to extend other features to the desktop. These include, e.g., web search and synchronization of address book and calendar entries. Synchronization of address book and calendar entries can maintain the same contacts and/or calendar entries between mail-enabled desktop applications such OUTLOOK/OUTLOOK EXPRESS and web-accessible address books such as the Yahoo! Address Book. The "Address Book" and "Calendar" buttons shown on the toolbar in FIGS. 2 and 3 can be used to launch the web-based properties they correspond to, and options can be listed on each button's dropdown menu to quickly perform certain tasks in the web-accessible address book such as Add Contact, Add Task, and New Note.

While the invention has been particularly shown and described with reference to preferred embodiments thereof, it will be understood by those skilled in the art that various changes in form and details may be made therein without departing from the spirit and scope of the invention.

What is claimed is:

1. Computer readable storage medium comprising computer program process code tangibly stored thereon, the computer program process code, when executed by a computer, causes the computer to execute a method comprising:

visibly displaying a search field within a user interface of a mail-enabled application running on a user's client computer and using a mail protocol to communicate with a mail server;

receiving a search term from a user via the displayed search field;

building a URL comprising said received search term;

communicating said URL to a web-accessible E-mail service; and, launching a browser to visibly display at least one web page resulting from said communication of said URL.

2. The computer readable storage medium of claim 1, wherein the web page resulting from the communication of the URL comprising results of a search of said user's messaging-related information stored on a server associated with said web-accessible E-mail service.

3. The computer readable storage medium of claim 2, wherein the messaging-related information comprising at least one of: said user's E-mail messages, attachments to said user's E-mail messages, said user's contacts, said user's calendar entries, said user's notes, an archive of said user's instant messaging activities.

4. The computer readable storage medium of claim 1, wherein said search field is a toolbar.

5. The computer readable storage medium of claim 1, wherein the computer program process code is a plugin to said mail-enabled application.

6. The computer readable storage medium of claim 1, wherein the computer program process code is integrated into said mail-enabled application at a source-code level.

7. The computer readable storage medium of claim 1, wherein the computer program process comprising a toolbar that is configured using a data feed from a remote feed server.

8. The computer readable storage medium of claim 7, the data feed comprising an XML data feed.

9. The computer readable storage medium of claim 1, further comprising visibly displaying a drop-down list of previously executed search terms in said mail-enabled application and receive a user selection of at least one search term from said list.

10. The computer readable storage medium of claim 1, further comprising interfacing with said mail-enabled application via an application program interface of said mail-enabled application.

11. The computer readable storage medium of claim 1, wherein the computer program process code further operating to use information defined by a data feed to build said URL.

12. The computer readable storage medium of claim 1, wherein the computer program process code further operating to use a literal URL portion to build said URL.

13. The computer readable storage medium of claim 1, wherein the computer program process code further operating to use an identification of a type of search to be performed to build said URL.

14. The computer readable storage medium of claim 1, wherein the computer program process code further operating to use a registry value to build said URL.

15. Computer readable storage medium comprising computer program process code tangibly stored thereon, the computer program process code, when executed by a computer, causes the computer to execute a method comprising:
  using a data feed received from a remote server to configure a toolbar;
  visibly displaying the toolbar within a mail-enabled application, the mail-enabled application running on a user's client computer and using a mail protocol to communicate with a mail server, the toolbar including a search field for receiving user input of a search term;
  using the search term to build a URL;
  communicating the URL to a web-accessible E-mail service; and,
  launching a browser to visibly display results of a search of said user's messaging-related information stored on a server associated with said web-accessible E-mail service.

16. The computer readable storage medium of claim 15, the data feed comprising an XML data feed.

17. The computer readable storage medium of claim 15, the computer program further displaying a drop-down list of previously executed search terms in said mail-enabled application and receiving a user selection of at least one search term from said list.

18. The computer readable storage medium of claim 15, the computer program using information defined by said data feed to build said URL.

* * * * *